Figure 1:
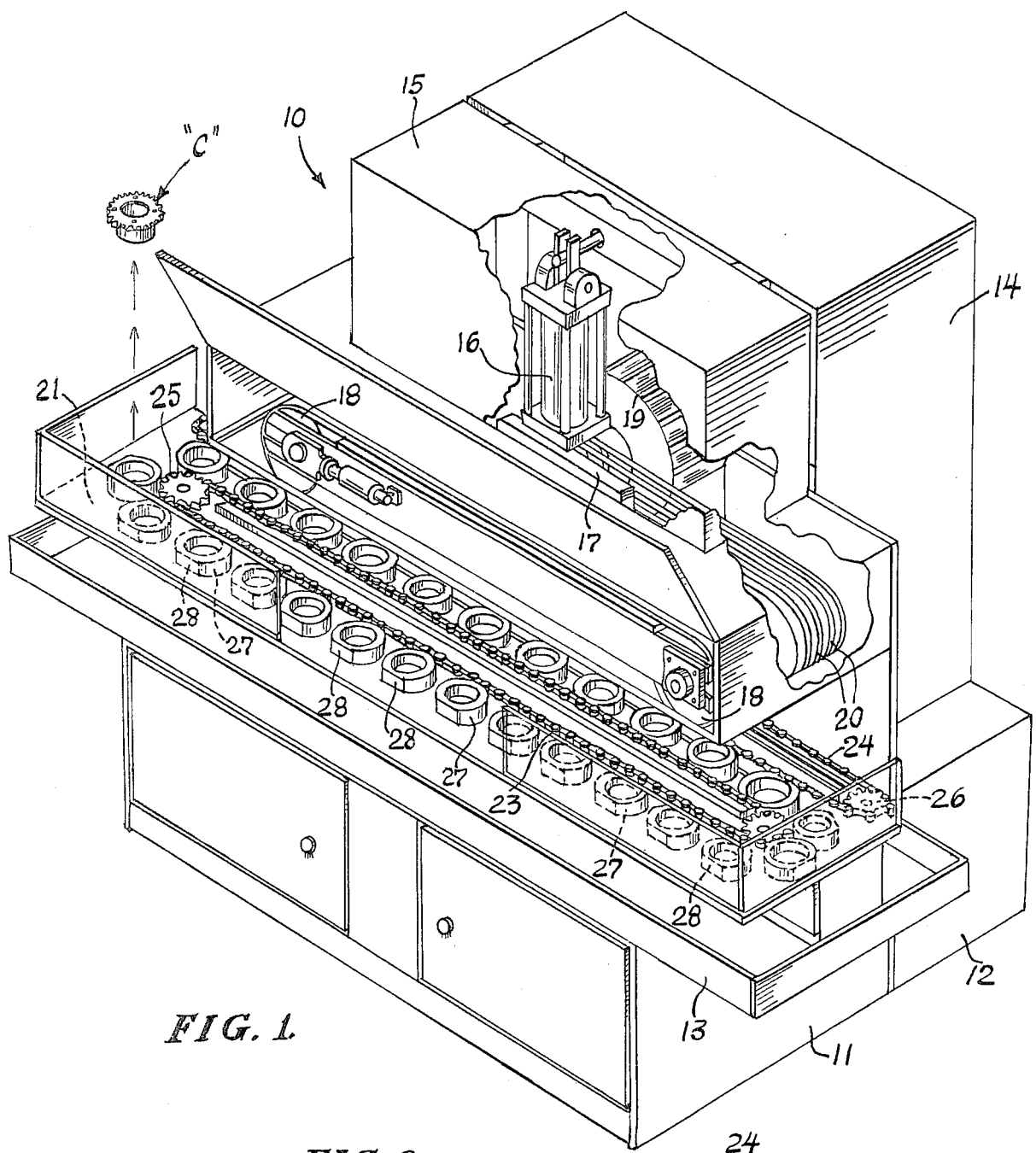

United States Patent [19]

Day

[11] 4,240,231
[45] Dec. 23, 1980

[54] RECTILINEAR WORK FINISHING APPARATUS

[76] Inventor: Lawrence Day, 906 Willow La., Mount Prospect, Ill. 60056

[21] Appl. No.: 939,361

[22] Filed: Sep. 5, 1978

[51] Int. Cl.³ .................... B24B 5/00; B24B 21/02; B24B 29/00

[52] U.S. Cl. .................... 51/138; 51/76 R; 51/131.1; 51/145 R

[58] Field of Search .................... 51/38, 76 R 79, 110, 51/131.1, 137, 138, 144, 145 R, 216 T, 237 R, 418, 419

[56] References Cited

U.S. PATENT DOCUMENTS

| 339,125 | 4/1886 | Allen | 51/138 |
|---|---|---|---|
| 1,193,673 | 8/1916 | Delbauve et al. | 51/138 |
| 1,660,535 | 2/1928 | Van Halteren | 51/145 R |
| 1,666,347 | 4/1928 | Platt | 51/110 |
| 2,239,714 | 4/1941 | Hammell | 51/418 X |
| 3,619,953 | 11/1971 | Hosoya et al. | 51/145 R |
| 3,769,754 | 10/1973 | Ixer et al. | 51/418 X |
| 3,909,986 | 10/1975 | Miyazawa et al. | 51/138 |

Primary Examiner—Harold D. Whitehead
Assistant Examiner—K. Bradford Adolphson
Attorney, Agent, or Firm—Edward C. Threedy

[57] ABSTRACT

An apparatus for finishing work pieces such as by abrading, grinding or polishing wherein said work pieces are carried by a work holder movable through a rectilinear path while being simultaneously rotated about a vertical axis beneath a continuous moving finishing element.

5 Claims, 15 Drawing Figures

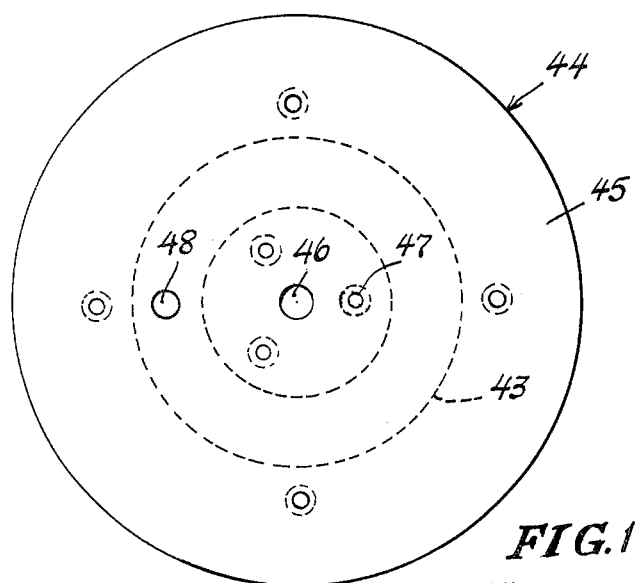
*FIG. 10.*
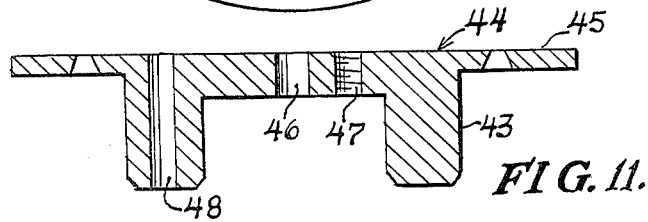
*FIG. 11.*
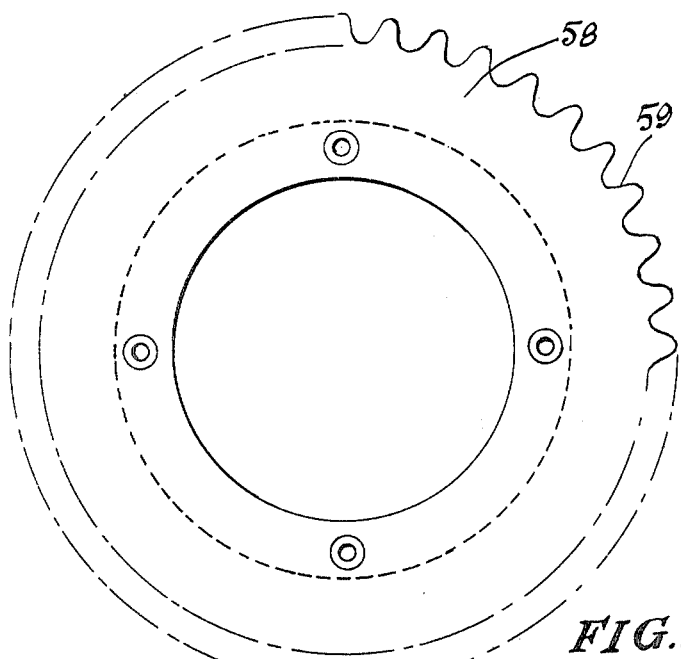
*FIG. 8.*
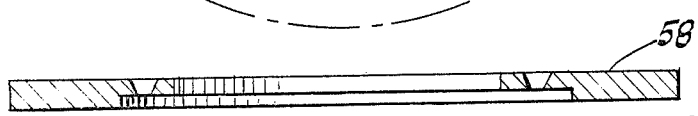
*FIG. 9.*
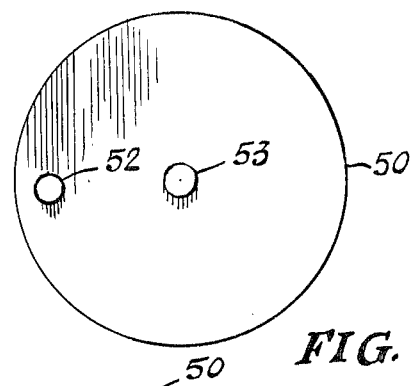
*FIG. 12.*
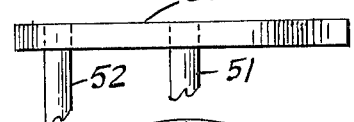
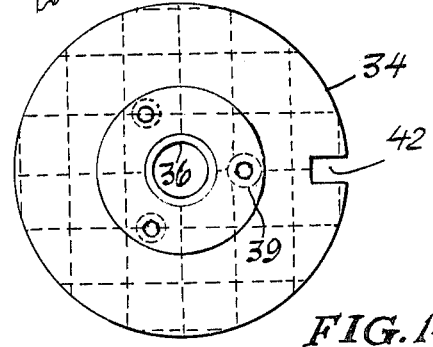
*FIG. 14.*
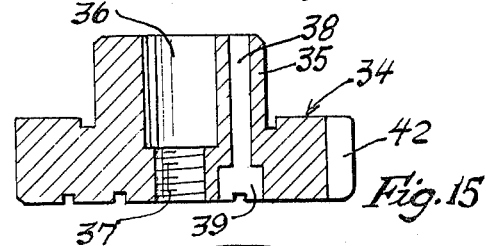
*Fig. 15.*
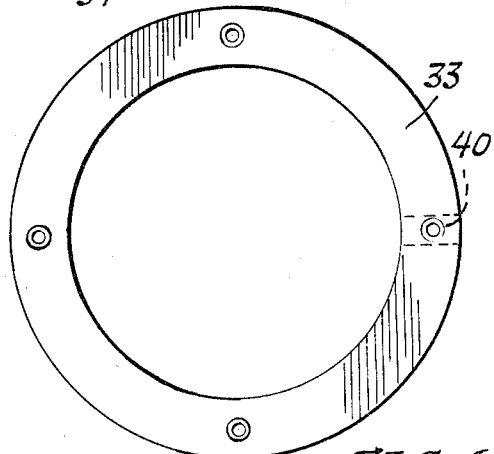
*FIG. 6.*
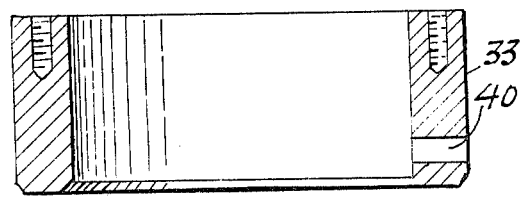
*FIG. 7.*

4,240,231

RECTILINEAR WORK FINISHING APPARATUS

SUMMARY OF THE INVENTION

This invention relates to an apparatus having a means for moving a plurality of work piece holders through an open work piece receiving station and beneath a rotating endless work finishing belt with the work piece holders movable through the work piece receiving station and beneath the rotating work finishing belt.

An object of the invention is to provide means whereby the work piece holder while will simultaneously be rotated about a vertical axis at a speed varying with the speed of movement through the path.

Another object of the invention is to provide means whereby during such movement of the work piece holder a portion thereof will be positioned through a substantial vertical component so as to be located relative to the rotating work finishing belt as well as with respect to the work piece receiving station.

The prior art apparatuses generally included a rotatable circular working member such as a lap plate or grinding tool upon which work pieces were positioned and through gearing or other connecting drive mechanisms caused to rotate about a vertical axis while being moved through the circular path of the working member. By this construction and operation the available work surface was restricted such that there was a limited number of operations that could be performed upon the work piece and therefore a definite limit to the productivity of the apparatus.

The present invention permits the work piece carriers to be moved through opposite parallel linear work paths with one path being available as a complete work station wherein the work pieces may be placed within the work holder and the finished work pieces removed therefrom. The opposing path constituted a work area wherein the work pieces not only moved relative to an endless work finishing member such as a polishing belt or the like but where the work pieces are also individually rotated about a vertical axis, to perform a highly efficient work finishing operation.

GENERAL DESCRIPTION

Figure 2:
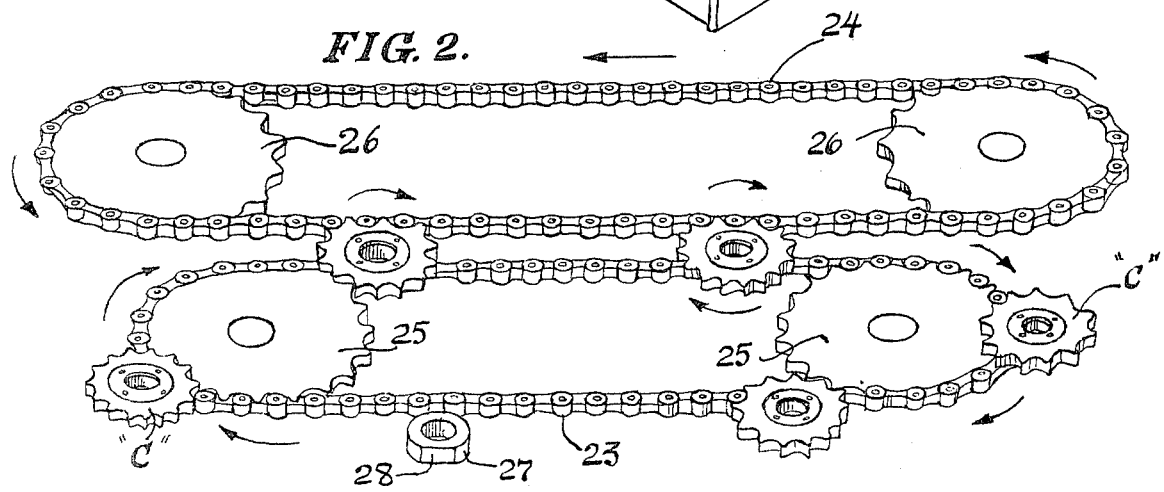

The invention will be best understood by reference to the accompanying drawings which show the preferred form of construction and operation by which the many objects of the invention are achieved and in which:

FIG. 1 is a fragmentary perspective view of the apparatus embodying the invention with certain portions thereof cut away for illustrative purposes, FIG. 2 is a schematic of the feed progression of the work piece holders incorporated in the invention.

Figures 3, 4, 5:
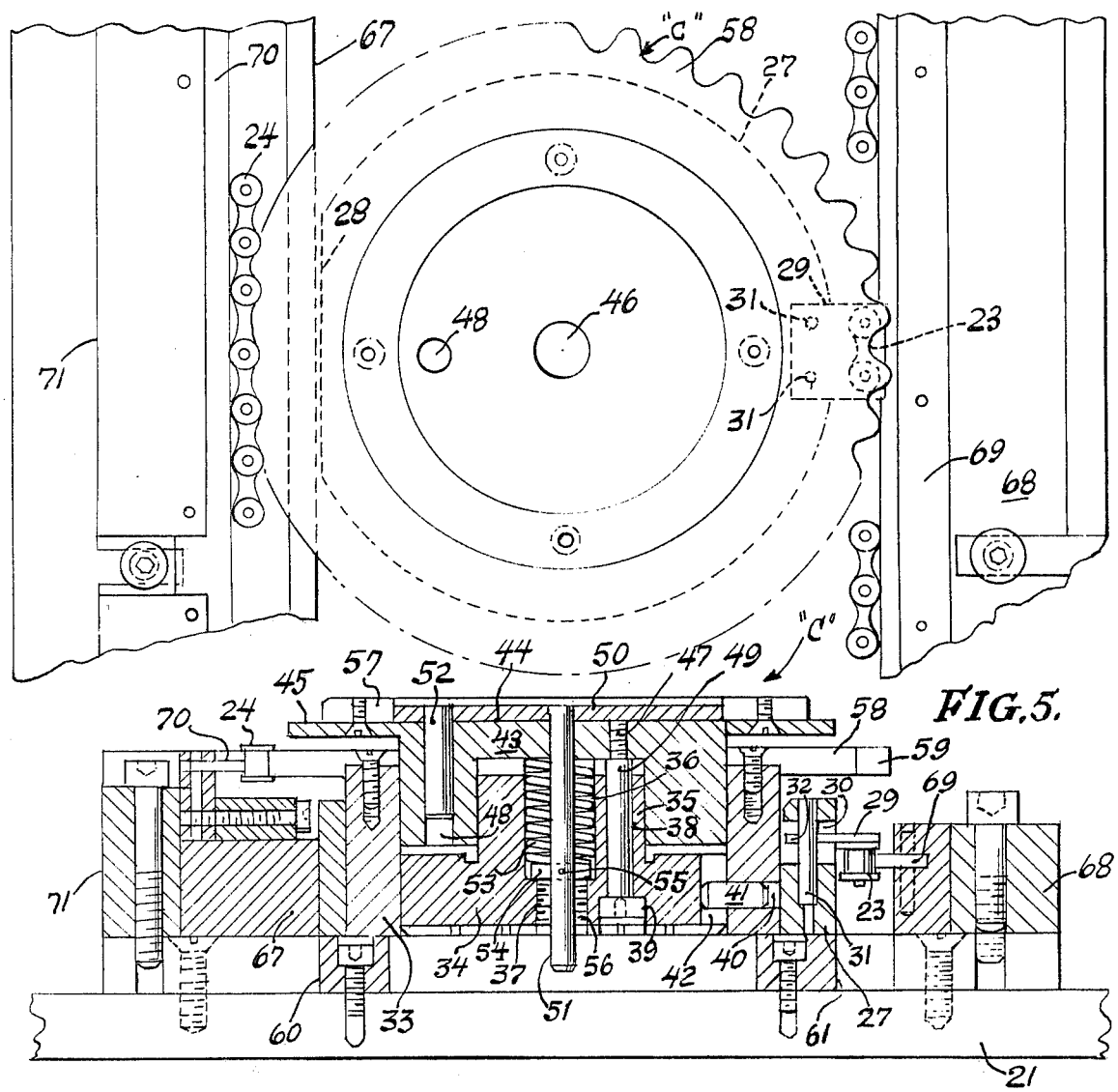

FIG. 3 is a top plan schematic view of the track layout as employed in the invention, FIG. 4 is a fragmentary detailed sectional view of the work piece holder and its drive mechanism, FIG. 5 is a fragmentary top plane view of the drive mechanism of the invention, FIG. 6 is a top plane view of the lower drive ring as employed in the invention, FIG. 7 is a detailed sectional view of the lower drive ring of FIG. 6, FIG. 8 is a top plane view of the work piece carrier drive sprocket, FIG. 9 is a detailed sectional view of the drive sprocket of FIG. 8, FIG. 10 is a top plane view of the upper slide block as used in the invention, FIG. 11 is a detailed sectional view of the upper slide block of the invention, FIG. 12 is a top plane view of the work piece mounting plate as used in the invention, FIG. 13 is a side elevational view of the work piece mounting plate of FIG. 12, FIG. 14 is a top plane view of the lower slide block as employed in the invention, and FIG. 15 is a detailed sectional view of the lower slide block of FIG. 14.

Referring to FIG. 1 of the drawings there is disclosed the preferred construction of the apparatus 10, which includes a base 11, a back cabinet 12, a forward deck 13, an upper compartment 14, as well as an upper cabinet 15.

The upper cabinet 15 is cut away so as to illustrate a hydraulic cylinder 16, the plunger of which is connected to a rail 17 which in turn supports a pair of drive drums 18. A suitable motor 19 is shown as being positioned within the upper compartment 15 as well as a series of drive belts 20, all for a purpose hereinafter more fully described.

Positioned above the forward deck 13 is a bed 21 which has positioned thereon a track arrangement 22 (see FIGS. 3 and 4). Supported by the bed 21 and in operable relation to the track 22 are a pair of endless chains 23 and 24. Chain 23, as shown schematically in FIG. 2, is adapted to be carried by a pair of drive sprockets 25, while chain 24 is threaded about a pair of drive sprockets 26. It should be noted that as shown in FIGS. 1, 2, and 4 the chains 23 and 24 each include a circular run which are positioned in a spaced apart horizontally offset plane.

Fixedly attached to the chain 23 are a plurality of carriers 27. Each of these carriers 27 are in the form of a hollow ring with a segment of their exposed periphery cut away to create an exposed guide face 28.

As shown in FIGS. 4 and 5 the chain 23 has fixedly attached thereto one end of a plate 29 the opposite end of which extends into a cut 30 formed in the wall of the carrier 27. A pair of locking pins 31 project through the cut 30 and corresponding aperatures 32 formed adjacent the free edge of the plate 29 so as to connect the carrier 27 to the chain 23.

By this arrangement when the drive sprockets 25 are caused to rotate by any suitable means such as by an electric motor not shown the chain 23 together with the carriers 27 will move in a clockwise direction about the drive sprockets 25 as viewed in FIGS. 1 and 2, and over the track arrangement 22 as shown in FIG. 4.

As stated in the objects of this invention, one of the principal features was that of moving a work piece carrier through a linear path while at the same time causing the work piece as carried thereby to be rotated about a vertical axis. To accomplish this object the following arrangement and construction of parts is proposed.

Adapted to be positioned within each of the carriers 27 is a work piece carrying vessel "C". This vessel "C" includes a circular lower drive ring 33. Within the lower drive ring 33 there is placed a circular lower slide block 34. The lower slide block 34 provides a raised centrally disposed hub 35 that has an internal bore 36 formed partially therethrough with such bore 36 having open communication with a reduced thread bore 37. A second aperature 38 is formed through the slide block 34 as well as the hub 35 and has an enlarged counterbore 39 opening on the bottom surface of the block 34 as shown in FIG. 15. The lower drive ring 33 has a keyway 40 formed through one wall thereof which is adapted to house a pin 41 the exposed end of which is adapted to be freely projected into a keyway 42 formed vertically in one wall of the block 34. By this arrangement the pin 41 connects the block 34 to the lower drive ring 33 for movement through a horizontal plane while at the same time permitting vertical movement of the block 34 within the lower drive ring 33 for a purpose hereinafter made apparent.

Adapted to be positioned so as to embrace the hub 35 of the lower slide block 34 is the hollow sleeve 43 of the upper circular slide block 44.

As shown in FIGS. 10 and 11 the upper slide block 44 provides circular flange 45 which has a diameter greater than the outer diameter of the sleeve 43. The upper slide block 44 provides a center aperature 46, a threaded aperature 47 to one side thereof, and a passage 48 to the other side thereof with said passage 48 extending clear through one wall of the sleeve 43.

A suitable bolt 49 projects through the aperature 38 formed in the lower slide block 34, and provides a threaded portion threadably received in the threaded opening 47 formed in the upper slide block 44. The latter is thus removably connected to the lower slide block 34.

Adapted to be carried on the exposed surface of the upper slide block 44 is a work piece mounting plate 50. This work piece mounting plate provides a center pin 51 extending from one side thereof as well as a connecting pin 52. As seen in FIG. 4 the center pin 51 projects through the center opening 46 formed in the upper slide block 44 and through the internal bore 36 and threaded counterbore 37 formed in the lower slide block 34. Adapted to be positioned within the hub 35 of the lower slide block 34 is a coil spring 53 which embraces the center pin 57 of the work piece plate 50. One end of the coil spring 53 bears upon the interior wall surface surrounding the center opening 46 formed in the upper slide block 44 while the opposite end of the coil spring 53 bears against a stop washer 54 connected by a suitable pin 55 to the center pin 51. A set screw 56 having a center bore through which the center pin 51 freely projects may be then threaded into the reduced counterbore 37 of the lower slide block 34 so as to close the same.

The connecting pin 52 provided by the work piece plate 50 will project into the passage 48 formed in the upper slide block 44 and functions to attach the work piece plate 50 to the upper slide block 44 for movement therewith as well as for vertical movement of the work piece plate 50 relative to the upper slide block 44 as hereinafter made apparent.

Adapted to embrace the work piece plate 50 is a guard ring 57 carried on the upper exposed face of the flange 45 of the upper slide block 44.

Fixedly attached to the upper edge of the lower drive ring is a carrier sprocket 58 the teeth 59 of which are adapted to engage the chain 24 so as to rotate all of the parts except the carriers 27 about a vertical axis, as such parts are moved by the corresponding movement of the carriers 27 by its chain drive 23, through a work station, hereinafter identified.

The apparatus as previously noted includes a track arrangement 22 schematically shown in FIG. 3. It should be noted that the track arrangement 22 is seated upon the bed 21 carried by the forward deck 13. The track arrangement comprises an outside rail 60 as well as an inside rail 61. At the front of the apparatus 10 there is placed between the outside rail 60 and inside rail 61 a center track 62 which at either end provides an inclined ramp 63. This center rail 62 in relation to the front of the apparatus 10 defines the work station at which point an operator is able to load and unload the work piece vessels "C".

At a point diagrammatically opposed to the work station the track arrangement 22 provides a work performance pad 64 which extends between the outside rail 60 and the inside rail 61. The pad 64 provides at opposite ends inclined ramps 65 which together with the entire pad is divided by a center groove 66. It is within this area defined by the pad 64 that the abrading, grinding or polishing work is performed.

A description of the operation is as follows: With the vessels "C" positioned within the carriers 24 and with the pair of endless chains 23 and 24 being moved by their respective drive sockets 25 and 26 with the chain 23 being rotated in a clockwise direction while the chain 24 is rotated in a clockwise direction the carriers 27 as well as the vessels "C" will move through the work station area.

As the carriers 27 and vessels "C" move the center pin 51 of the work piece mounting plate will engage the ramp 63 of the center rail 62 and be caused to move against the tension of the coil spring 53 in a vertical direction so as to raise the work piece mounting plate 50 in an elevated position relative to the ring guard 57. In such an elevated position of the work piece mounting plate 50 a work piece may be placed thereon and continuously carried by the movement of the carriers 27 and vessels "C" through the work station. As the carrier 27 travels about the end curve of the track arrangement 22 it will bring into engagement with chain 24 the carrier sprocket 58. This will effect rotation about a vertical axis of the vessel "C" together with the work piece positioned upon the work piece mounting plate. As the carrier 27 continues to be driven in one direction by its engagement with chain 23 the vessel "C" will be caused to rotate about a vertical axis as the carrier sprocket 58 is driven by chain 24.

As the carrier 24 approaches the pad 64 the lower slide block 34 will ride up the ramp 65 as the exposed portion of the center pin 51 will pass through the center groove 66. As the lower slide block 34 passes over the top surface of the pad 64 the work piece as carried by the work piece mounting plate 50 will be brought into engagement with the endless belt rotating about the drive drums 18.

After traveling over pad 64 with the work piece in engagement with the work finishing belt the vessel "C" will descend down the opposite ramp 65 back to its original position wherein the lower drive ring 33 will sit upon the outer rail 60 and inner rail 61 and be moved through the curved end of the track arrangement 22 and again into the work station where the center track 62 will engage the center pin 51 raising the work piece mounting plate as well as the work piece carried thereby in an elevated position with respect to the carrier 27 and vessel "C" whereby it may be readily removed by the operator.

To assure the proper alignment of the carriers 27 as well as the vessels "C" as they travel through their respective paths through the work station and work performance area there has been provided a guide 67 which is adapted to have facial contact with the guide face 28 provided on one side of the carrier 27 as it moves beneath the work performance area (see FIG. 4).

There is also provided a center guide bar 68 disposed between the drive sockets 25 which provide at one side edge a chain guide 69 for the chain 23. A like chain guide 70 is provided by a rear wall 71 which is disposed between the drive sprockets 26 and which is adapted to be engaged by the chain 24. Thus during the period when the carriers 27 are moved through the work performance area and the vessels "C" are caused to rotate about their vertical axes within this area the drive chains 23 and 24 will be positively guided through their travel as well as the carriers 27.

From the foregoing it is apparent that there has been described an apparatus by which all of the stated objects of the invention can be achieved. The apparatus provides a continuous work finishing process to be performed during a linear movement horizontally beneath a work finishing rotating member as well as causing a rotation about a vertical axis of the work piece while simultaneously being moved through the horizontal linear path.

I claim

1. A work piece finishing apparatus having a deck over which pieces of work to be finished are moved through an elliptical path with a linear section which passes beneath a work piece finishing belt having a continuous rotational movement about a horizontal axis comprising:
   (a) a ring-like work piece carrier adapted for movement over the deck through said elliptical path and beneath the workpiece finishing belt,
   (b) a work piece carrying vessel mounted on said work piece carrier, means mounting said vessel for independent rotational movement about a vertical axis with respect to said carrier,
   (c) a work piece mounting plate carried by and rotatable with said vessel about said vertical axis, means mounting said plate for independent vertical movement relative to said vessel,
   (d) means for moving said work piece carrier and said work piece carrying vessel beneath the work piece finishing belt,
   (e) means for rotating said work piece carrying vessel about said vertical axis independent of the movement of said vessel with said work piece carrier through said elliptical path over the deck and beneath the work piece finishing belt, and
   (f) means for elevating said work piece mounting plate above said vessel and into contact with the finishing belt as said vessel and said plate are rotated about said vertical axis and moved with said carrier beneath the finishing belt.

2. A work piece finishing apparatus as defined by claim 1 wherein said means for moving said work piece carrier beneath the work piece finishing belt comprises an endless chain rotatable through an elliptical path over the deck and means for connecting said chain to said work piece carrier.

3. A work piece finishing apparatus as defined by claim 1 wherein said means for rotating said work piece carrying vessel comprises a second endless chain rotatable through a second elliptical path over the deck, and means releasable connecting a portion of said work piece carrying vessel to said second endless chain for rotating said vessel about said vertical axis as said vessel is moved with said work piece carrier beneath the work piece finishing belt.

4. A work piece finishing apparatus as defined by claim 3 wherein said work piece carrying vessel includes a toothed sprocket including a plurality of teeth which are adapted for releasable engagement with said second endless chain for rotating said work piece carrying vessel about said vertical axis as said vessel is moved with said work piece carrier over the deck and beneath the work piece finishing belt.

5. A work piece finishing apparatus as defined by claim 1 wherein said means for elevating said work piece mounting plate comprises a raised track positioned on the deck of the apparatus beneath the work piece finishing belt, and wherein said work piece mounting plate provides a depending pin extending through said work piece carrying vessel and in a path of said raised track so as to cause said mounting plate to be raised above said work piece carrying vessel and into contact with the work piece finishing belt.

* * * * *